(12) United States Patent
Hatch

(10) Patent No.: US 8,788,548 B2
(45) Date of Patent: Jul. 22, 2014

(54) MULTIMODE MATHEMATICAL USER INTERFACE

(75) Inventor: Jeff Hatch, Wilmington, CA (US)

(73) Assignee: I.Q. Joe, LLC, Rancho Palos Verdes, CA (US)

( * ) Notice: Subject to any disclaimer, the term of this patent is extended or adjusted under 35 U.S.C. 154(b) by 1425 days.

(21) Appl. No.: 11/925,560

(22) Filed: Oct. 26, 2007

(65) Prior Publication Data

US 2008/0104153 A1 May 1, 2008

Related U.S. Application Data

(60) Provisional application No. 60/854,920, filed on Oct. 27, 2006.

(51) Int. Cl.
*G06F 15/02* (2006.01)

(52) U.S. Cl.
USPC ............ 708/130; 708/131; 708/144; 708/145

(58) Field of Classification Search
None
See application file for complete search history.

(56) References Cited

U.S. PATENT DOCUMENTS

| 4,481,598 A | 11/1984 | Ishiwata |
| 5,089,980 A * | 2/1992 | Bunsen et al. ............... 708/137 |
| 6,854,001 B2 | 2/2005 | Good et al. |
| 2005/0179665 A1 | 8/2005 | Kuo |

OTHER PUBLICATIONS http://web.archive.org/web/20040401164706/http://ftp.casio.co.jp/pub/world_manual/edu/en/fx115MS_991MS_E.pdf; Casio Manual; Apr. 1, 2004; pp. 1-42.*
http://web.archive.org/web/20010304195513/http://users.ece.gatech.edu/~bonnie/book/TUTORIAL/tut_1.html; MatLab Tutorial; Oct. 30, 2001.*
PCT International Search Report, App. No. PCT/US2009/032448, Date: Jun. 22, 2009, in 3 pages.

* cited by examiner

*Primary Examiner* — Michael D Yaary
(74) *Attorney, Agent, or Firm* — Knobbe Martens Olson & Bear LLP

(57) ABSTRACT

Aspects of the present disclosure include a quick and easy user interface system for allowing a user to format mathematical expression on a math program as they would be formatted in longhand. The user interface is configured to switch between a linear math expression entry scheme and a structured math expression entry scheme based on a user's math expression entries in order to predict the user's desired entry format. The user interface contains additional shortcuts and display features which enable a user to enter mathematical expressions quickly and easily, with less confusion.

18 Claims, 16 Drawing Sheets

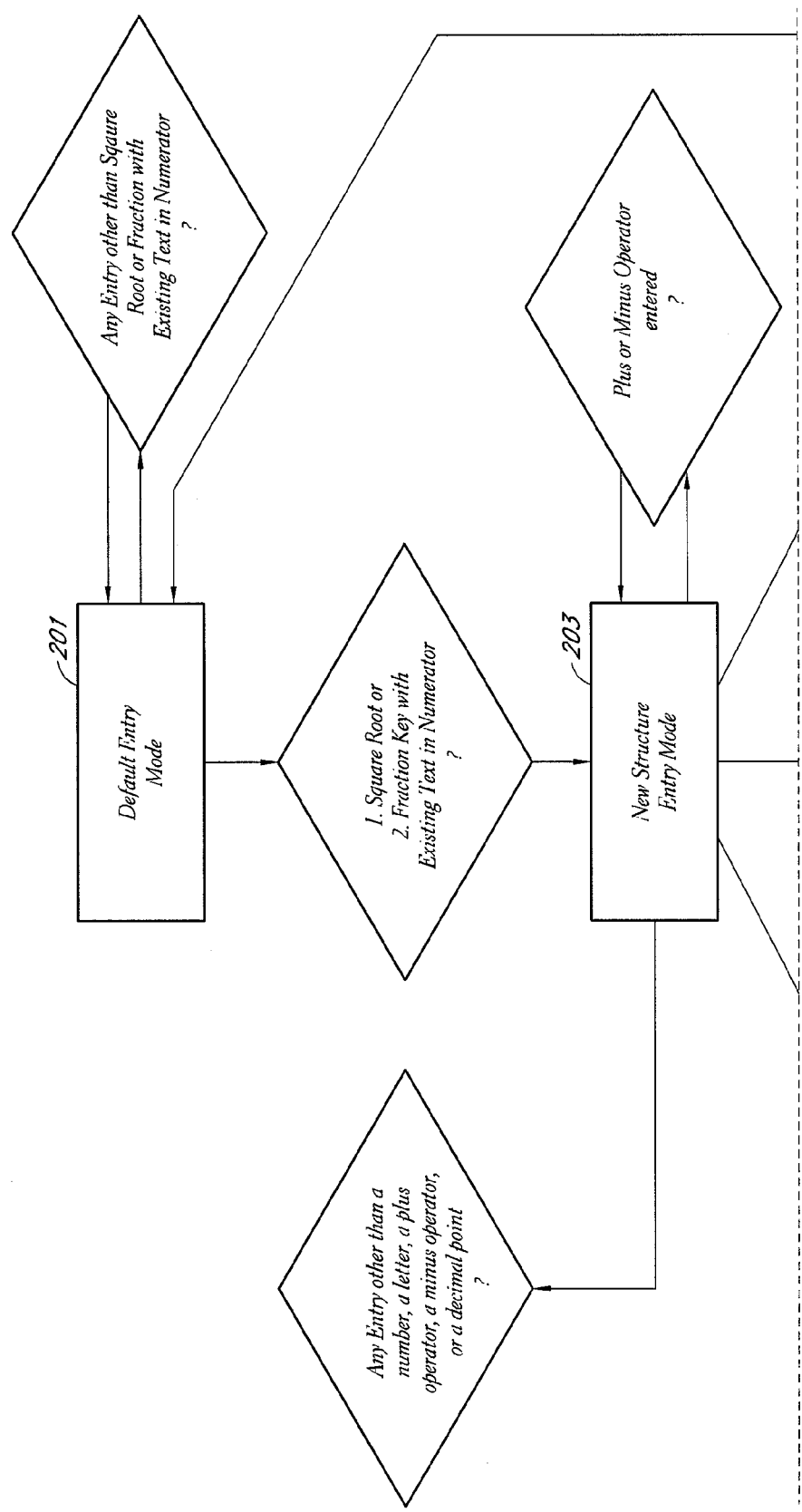

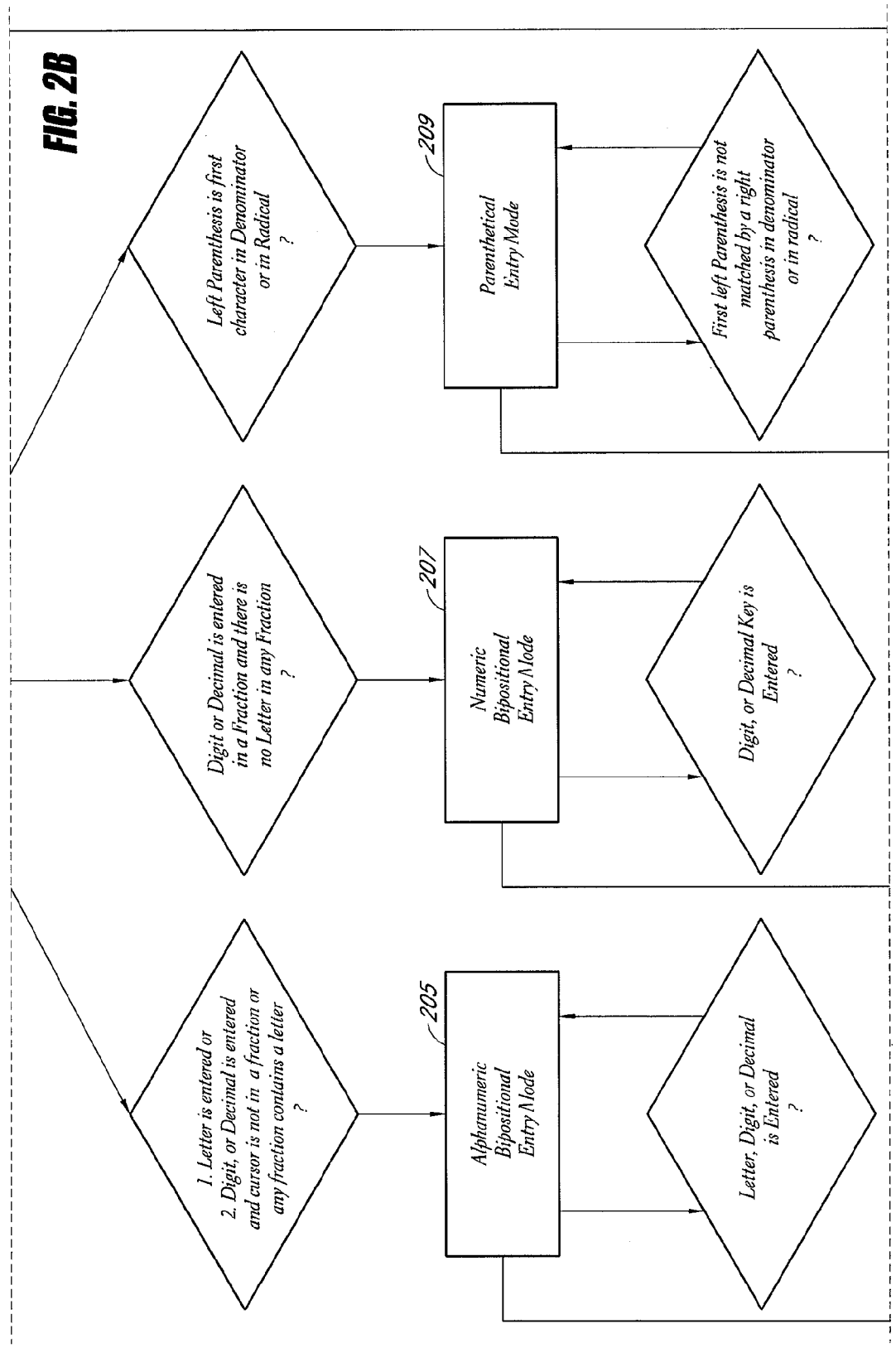

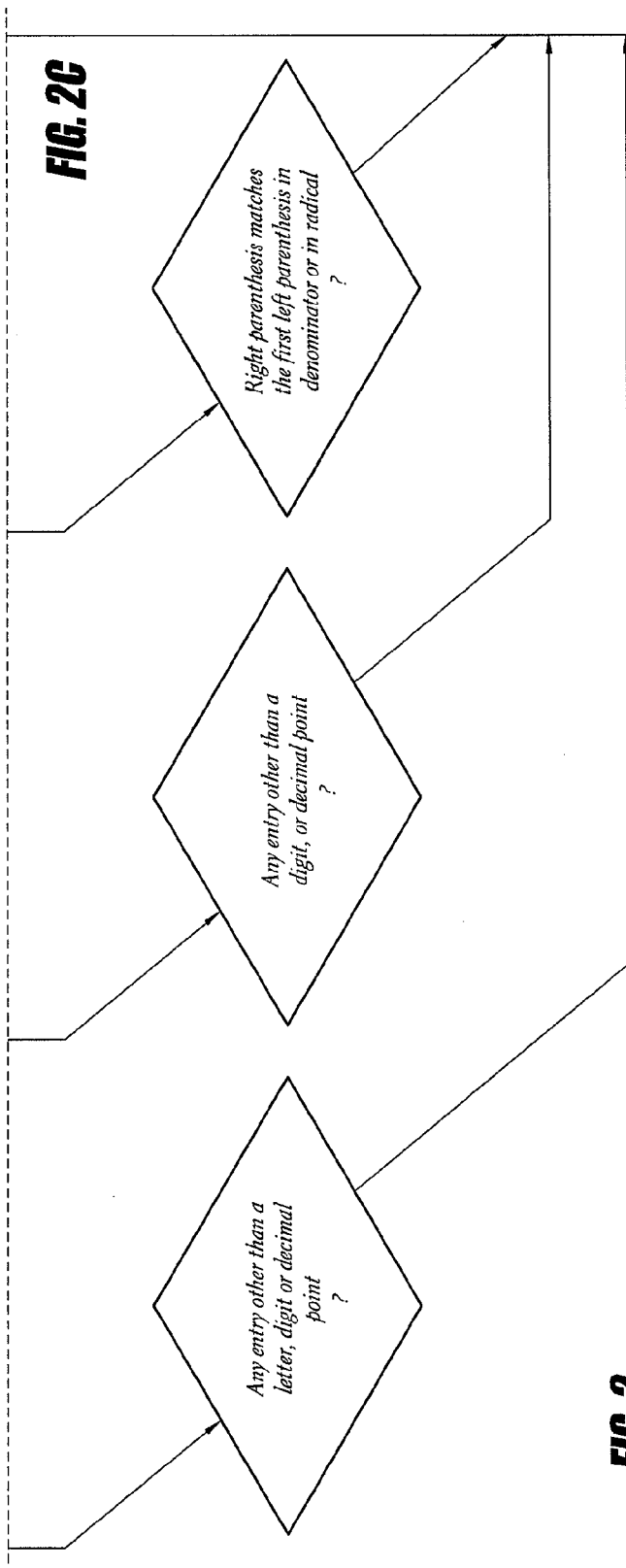

| | ENTRY | MODE | DISPLAY |
|---|---|---|---|
| 257 | 1 | Default | 1 |
| 259 | 1/ | New Structure | $\underline{1}$ |
| 261 | 1/2 | Numeric Bipositional | $\frac{1}{2}$ |
| 263 | 1/2x | Default | $\frac{1}{2}x$ |
| 265 | 1/2x+ | Default | $\frac{1}{2}x+$ |
| 267 | 1/2x+2 | Default | $\frac{1}{2}x+2$ |
| 269 | 1/2x+2/ | New Structure | $\frac{1}{2}x+\underline{2}$ |
| 271 | 1/2x+2/3 | Numeric Bipositional | $\frac{1}{2}x+\frac{2}{3}$ |
| 273 | 1/2x+2/3y | Default | $\frac{1}{2}x+\frac{2}{3}y$ |
| 275 | 1/2x+2/3y= | Default | $\frac{1}{2}x+\frac{2}{3}y=$ |
| 277 | 1/2x+2/3y=7 | Default | $\frac{1}{2}x+\frac{2}{3}y=7$ |
| 279 | 1/2x+2/3y=7/ | New Structure | $\frac{1}{2}x+\frac{2}{3}y=\underline{7}$ |
| 281 | 1/2x+2/3y=7/6 | Numeric Bipositional | $\frac{1}{2}x+\frac{2}{3}y=\frac{7}{6}$ |

FIG. 2D

MULTIMODE MATHEMATICAL USER INTERFACE

PRIORITY CLAIM

The present application claims priority benefit under 35 U.S.C. §119(e) from U.S. Provisional Application No. 60/854,920, filed Oct. 27, 2006, entitled MULTIMODE MATHEMATICAL USER INTERFACE, which is incorporated by reference herein.

FIELD OF THE INVENTION

The present invention relates to the field of mathematical expression entry systems for use on computing platforms.

BACKGROUND

Electronic devices, such as computers and calculators have become very useful tools for analyzing mathematical expressions. Increasingly, students in schools use calculators to aid them in learning math. The graphing calculator in particular has become a very popular tool for students. Graphing calculators are generally capable of solving complex mathematical expressions, graphing and comparing functions, plotting and analyzing data, computing financial and statistical equations, and running additional software.

SUMMARY OF THE DISCLOSURE

However, graphing calculators, like math programs running on personal computers (PC's), are generally overly complicated to use and often are unable to format a mathematical expression to be similar on the calculator as it is in longhand. Some calculators and personal computer programs are capable of formatting mathematical expressions to look similar in some ways to longhand math expression, such as, for example, Microsoft Equation Editor or the like, but these programs are often difficult and time consuming to use. Aspects of the present disclosure include a straightforward user interface system for allowing a user to format mathematical expression on a math program similar to how they would be formatted in longhand. In addition, the present disclosure discloses a system for predicting the entry preferences of a user based on the user's entry. In an embodiment, the user interface is configured to employ a linear math expression entry scheme or a structured math expression entry scheme based on, for example, the user's math expression entries.

As used herein, the term "linear math entry scheme" includes its broad meaning known to one of skill in the art, which includes to a system of entering math expressions in an unformatted way. For example, in order to enter a fraction in a linear math entry scheme, the user first enters the numerator, then presses the fraction key, and finally enters the denominator. Thus, $$\frac{1}{2}$$

is entered as ½.

This mechanism for fraction entry works well for entering simple mathematical expressions, but it does not work as well as other entry schemes for entering more complicated mathematical expressions. If a fraction includes multiple terms in its numerator and/or denominator, and a user enters that numerator and/or denominator exactly as it appears in longhand, then the user's unformatted text will be misinterpreted by a linear math entry scheme. For example, if a user sees the formatted mathematical expression $$\frac{x+1}{x+2}$$

and enters x+1/x+2, then a standard math parser using the linear math entry scheme will interpret the user's entry to mean $$x + \frac{1}{x} + 2, \text{ not } \frac{x+1}{x+2}.$$

A user of the linear math entry scheme can avoid this problem by enclosing in parentheses every numerator and denominator which contains multiple terms. For example, to enter $$\frac{x+1}{x+2},$$

a user can enter (x+1)/(x+2). However, the need for insertion of parentheses causes a number of drawbacks. For example, requiring the user to enclose numerators and denominators in parentheses requires a number of additional keystrokes. In addition, using parentheses is generally not intuitive to many users and it does not match what a user sees in a math book. Also, the need to insert parentheses when entering more complicated math expressions often leads to frustrating mistakes that can be difficult to detect and correct.

As used herein, the term "structured math entry scheme" refers to a system for entering math expressions in a formatted form, so that they look like they were written in a longhand style. This style of entry generally provides an easy environment for editing an expression. However, the structured math entry scheme is often cumbersome and anti-intuitive in terms of the order of the buttons that must be pushed.

For example, using a structured math entry scheme, and using the same example as above, to create a fraction, a user may need to first press the fraction key, then enter the numerator, then press the down arrow key, then enter the denominator. Thus, a user can enter $$\frac{x+1}{x+2}$$

by pressing/x+1↓x+2→. Although this entry scheme alleviates the need to use parentheses, it is often counterintuitive in that the fraction operator key, must be pressed first in some instances. Also, for some expressions, a greater number of keystrokes is required. For example, in order to enter $$\frac{1}{2} + \frac{1}{3}$$

in a linear math entry interface requires only seven keystrokes: ½+⅓. To enter $$\frac{1}{2} + \frac{1}{3}$$

in a structured math entry interface requires 111 keystrokes: /1↓2→+/1↓3→. This slows the user down and is far from intuitive.

Although the above examples were described with respect to fraction entry, similar disadvantages in both the linear math entry scheme and the structured math entry scheme exist with regard to radical entry, exponent entry, as well as other math operator entries. For example, in a linear math entry scheme, a user may be confused by the need to insert additional parentheses when creating radicals and/or exponents. Thus, if a user wishes to enter $\sqrt{x+1}+x^{2y}$, the user will enter √(x+1)+x^(2y). If the user enters √x+1+x^2y without inserting additional parentheses, a standard math parser will take this entry to mean $\sqrt{x}+1+x^2y$.

A structured math entry scheme generally will not require the user to enter extra parentheses, however, a structured math entry scheme may slow the user down by requiring the user to press the right arrow key after creating each radical or exponent. For example, to enter $\sqrt{8}+\sqrt{18}$ in a linear math entry scheme may require as little as six keystrokes: √8+√18; but entering $\sqrt{8}+\sqrt{18}$ in a structured math entry scheme may require at least eight keystrokes: √8→+√18→.

As shown in the previous examples, both the structured and linear math entry schemes have drawbacks depending on the enter of expression being entered. A multimode system of the present disclosure solves these and other problems by providing a user entry scheme that switches automatically during entry between the two schemes in order to optimize user entries.

In an embodiment, a multimode mathematical entry interface is disclosed. The multimode mathematical entry interface includes a first entry mode scheme and a second entry mode scheme. The interface also includes a module configured to determine when to switch from the first entry mode to the second entry mode based on a user's expression entries. In an embodiment, the first entry mode is a structural math entry mode and the second entry mode is a linear math entry mode. In an embodiment, the first entry mode is a linear math entry mode and the second entry mode is a structural math entry mode. In an embodiment, the interface switches between the first entry mode and the second entry mode based on an expression entry key pressed by the user. In an embodiment, the interface switches modes when a user selects one or more of a fraction key, a radical key, or an exponential key. In an embodiment, alphanumeric entries are handled differently within a fraction function, a radical function or an exponential function than outside of these functions. In an embodiment, unnecessary parentheses are removed for simplification purposes. In an embodiment, the interface is configured to allow the user to enter and display mixed fractions. In an embodiment, cycling keys are provided for allowing a user to enter different characters based on a number of times a particular key is pressed in rapid succession.

BRIEF DESCRIPTION OF THE DRAWINGS

FIG. 2A-C (collectively referred to as FIG. 2) illustrate a simplified flowchart of an embodiment of a multimode math entry interface operation.

FIG. 2D illustrates a sample user entry character stream interpreted by a multimode math entry interface.

DETAILED DESCRIPTION

A graphing calculator has a relatively small number of keys, so certain functions must be accessed by pressing a two-keystroke combination. For example, on some graphing calculators, there is no key with the primary function of creating a square root, so a user who wishes to type a square root symbol must first press some special shift key (such as 2ND) and then press another key. It is to be understood that any "key" referred to herein (such as the square root key) may be only a single keystroke on certain platforms, and may be a combination of two keystrokes on certain other platforms.

Figure 1:
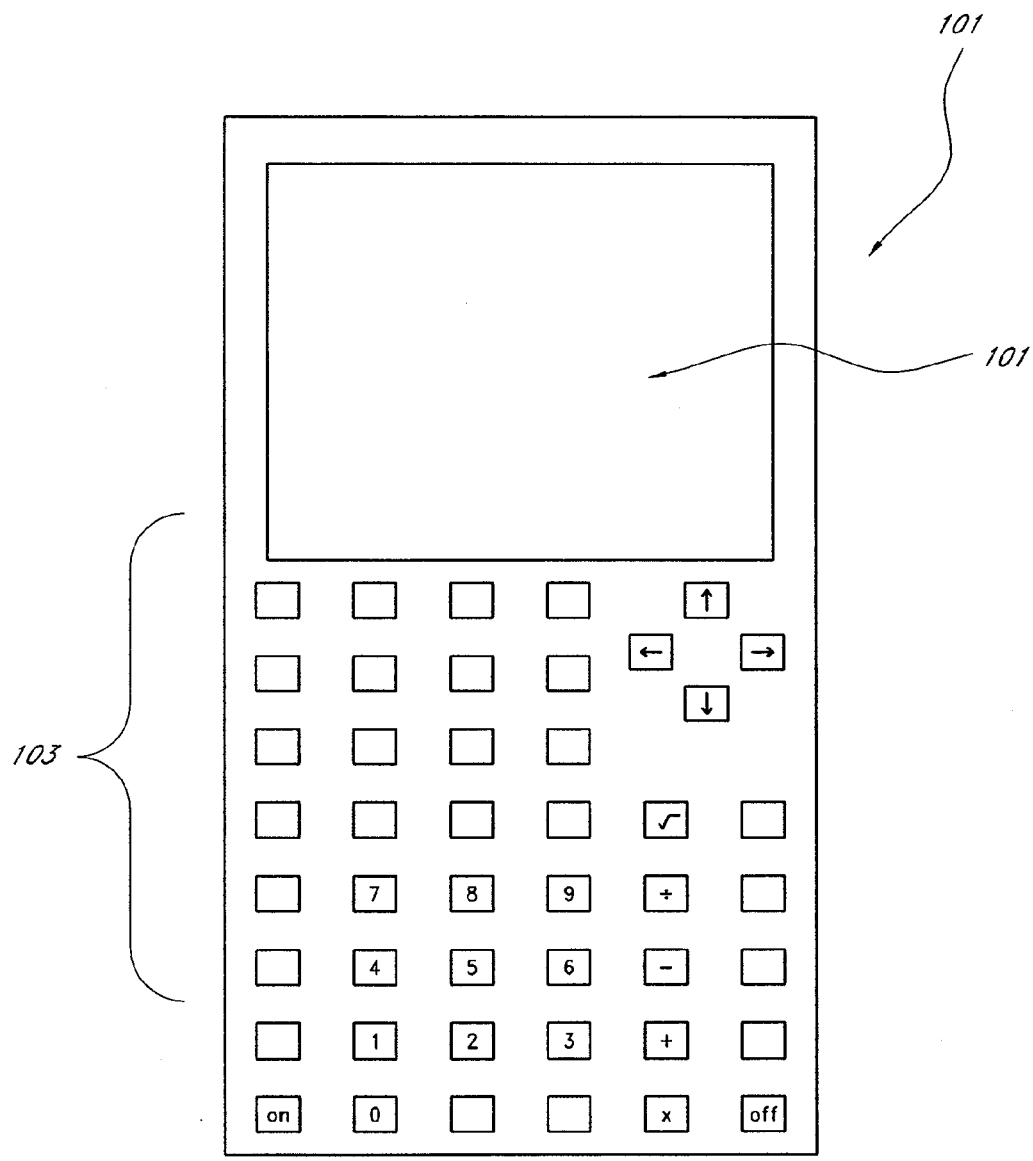
FIG. 1 illustrates a simplified typical graphing calculator.

FIG. 1 illustrates a graphing calculator 101. The graphing calculator 101 has keys 103 and a display screen 105. There are many different types of graphing calculators generally available for sale, each with its own unique key scheme and functionality. For example, graphing calculators manufactured and sold by Texas Instruments, Casio, Hewlett-Packard, and other manufacturers are readily available for sale. In addition, various expression entry and solving programs for personal computers are also readily available. For example, software programs for math expression entry and solving are available from Softmath, Bagatrix, Inc., Maplesoft, Design Science, Microsoft and other manufacturers. It is to be understood by a person of skill in the art that the present disclosure is not limited to a particular graphing calculator or computing platform, rather, the present disclosure can be used on any mathematical expression entering or solving platform including calculators, graphing calculators, personal computers, mobile phones, PDA's, or the like for use with any program editing software.

In general, aspects of the present disclosure can be implemented in both hardware and software. In an embodiment, aspects of the present invention are implanted in software and downloaded onto the user's platform. For example, the software can be downloaded from a network connection, such as the internet, or from a compact disc or other storage medium. Once on the platform, the software can be integrated into the existing platform, or form a separate platform.

The multimode math entry interface software, also referred to herein as "the interface," has multiple modes enabling it to variously mimic the operation of either a linear math entry style or a structured math entry style. In general, because complicated mathematical expressions are easier to edit in a structured math entry style, pressing an arrow key will usually cause the interface to enter a mode which mimics the structured math entry style. In general, because simple mathematical expressions can be typed more quickly in a linear math entry style, pressing certain keys will cause the interface to enter a new structure entry mode which will subsequently cause the interface to mimic the linear math entry style, allowing the interface to automatically move out of a mathematical structure, such as, for example, a fraction or radical, without the need to press an arrow key.

Figure 1A:
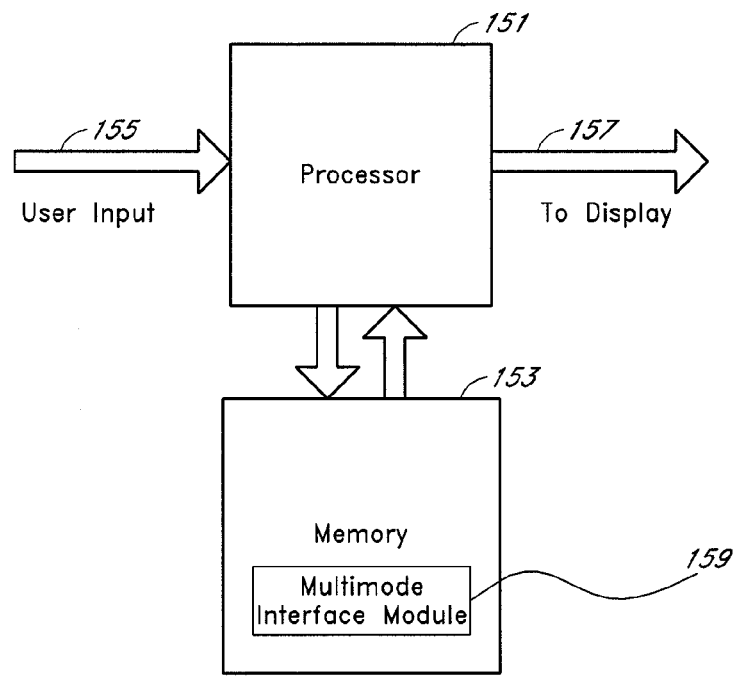
FIG. 1A illustrates a processing system for processing mathematical expressions.

FIG. 1A illustrates an embodiment of the hardware used in a mathematical expression processing system. A processor 151 is in communication with memory 153. Memory 153 can be read only, read write, flash, RAM, ROM, or the like. The processor accepts user inputs, processes the user inputs in communication with the memory. The processor also sends information to the display. As shown in FIG. 1A, the multimode math entry interface module is stored in the memory 153.

FIG. 2 illustrates a flowchart of an embodiment of a multimode math entry interface program. The system starts at block 201 in the default entry mode. In the default entry mode, the interface operates similar to a structured math entry interface. However, if a square root is pressed, then the system moves to block 203 where the system operates in a new structure entry mode as described below. Similarly, if the fraction key is pressed and a standard mathematical parser determines that the user has already typed the new fraction's numerator, then the system also moves to the new structure entry mode. In an embodiment, if an exponent key is pressed, the system also moves to the new structure entry mode.

The new structure entry mode 203 provides special rules for characters entered while in this mode. If the user presses the "+" key or "−" key, then the "+" or "−" character is inserted at the cursor position as usual and the interface remains in the new structure entry mode 203. If the user presses any key which causes text to appear other than the "+" or "−" characters, or which causes the cursor to move, the multimode math entry interface will automatically exit the new structure entry mode 203 after processing that key. If the interface does not enter some other special mode after processing that key, as described below, then the interface will revert to the default mode. For example, if the user presses the up arrow while the interface is in new structure entry mode 203 and the cursor is in the denominator, then the cursor will move up onto the fraction bar and the multimode math entry interface will revert to the default mode.

If the user presses a letter, digit, or decimal point key while the interface is in the new structure entry mode 203, then the interface displays a letter or digit or decimal point character as usual and then enters either the alphanumeric bipositional entry mode 205 or the numeric bipositional entry mode 207. If the user presses a digit or decimal key and either the cursor is in an exponent or the cursor is in the denominator of a fraction and no fraction in the expression already contains a letter in its numerator or denominator, the interface will enter the numeric bipositional entry mode 207. Otherwise, the interface will enter the alphanumeric bipositional entry mode 205. The purpose of alphanumeric bipositional entry mode 205 and the numeric bipositional entry mode 207, jointly referred to herein as the "bipositional entry modes" is to predict the likely entry expectations of the user based on the existing expression already entered and the character or key currently being entered. This prediction function is described in further detail below.

In accordance with the above described rules for entering the bipositional entry modes, the multimode math entry interface may be in a bipositional entry mode when the cursor is at the end of a denominator or radical which contains some text. When the multimode math entry interface is in a bipositional entry mode and the user presses a text key, either the interface inserts the new character inside the denominator or radicand and remains in bipositional entry mode or the interface moves the cursor out of the denominator or radicand, inserts the new character to the right of the fraction or radical symbol, and reverts to the default mode. The determination of which of these two possibilities will occur is based on the key the user presses. If the user presses a digit or decimal point key, then the digit or decimal point character is inserted inside the denominator or radicand and the interface remains in bipositional entry mode. If the user presses a letter key, then the letter character is inserted inside the denominator or radicand if the interface is in alphanumeric bipositional entry mode, as opposed to numeric bipositional entry mode. If the user presses any other text key, such as, for example, the "+" key, then the character is inserted outside the denominator or radicand, and the interface reverts to default mode.

Figure 3A:
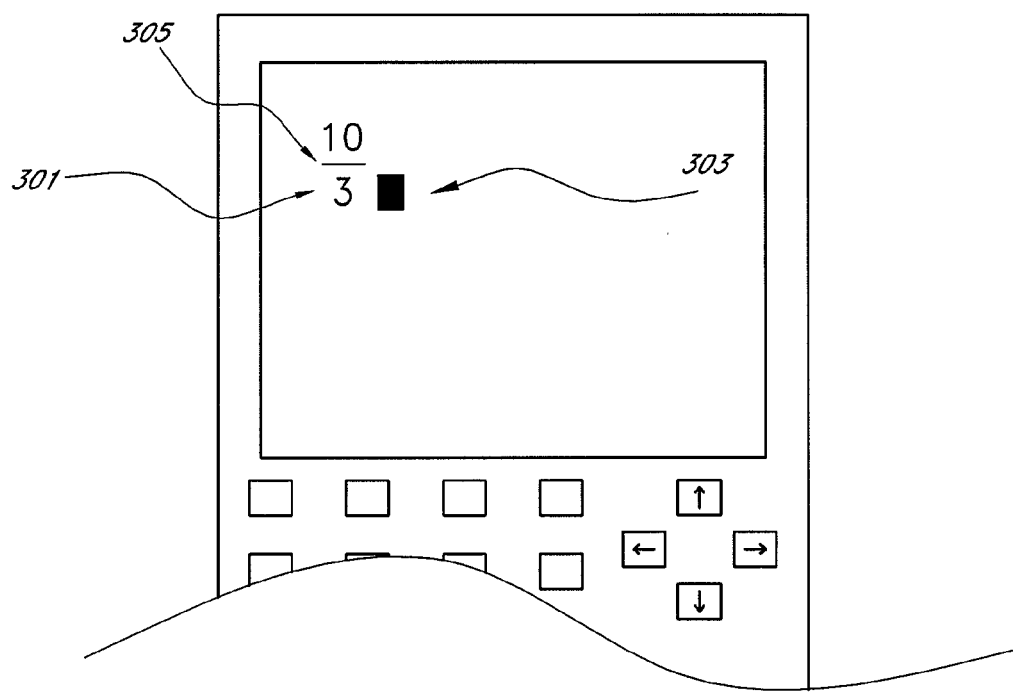
FIGS. 3A-3C illustrates a screen shot of a bipositional entry mode of a fraction.
Figure 3B:
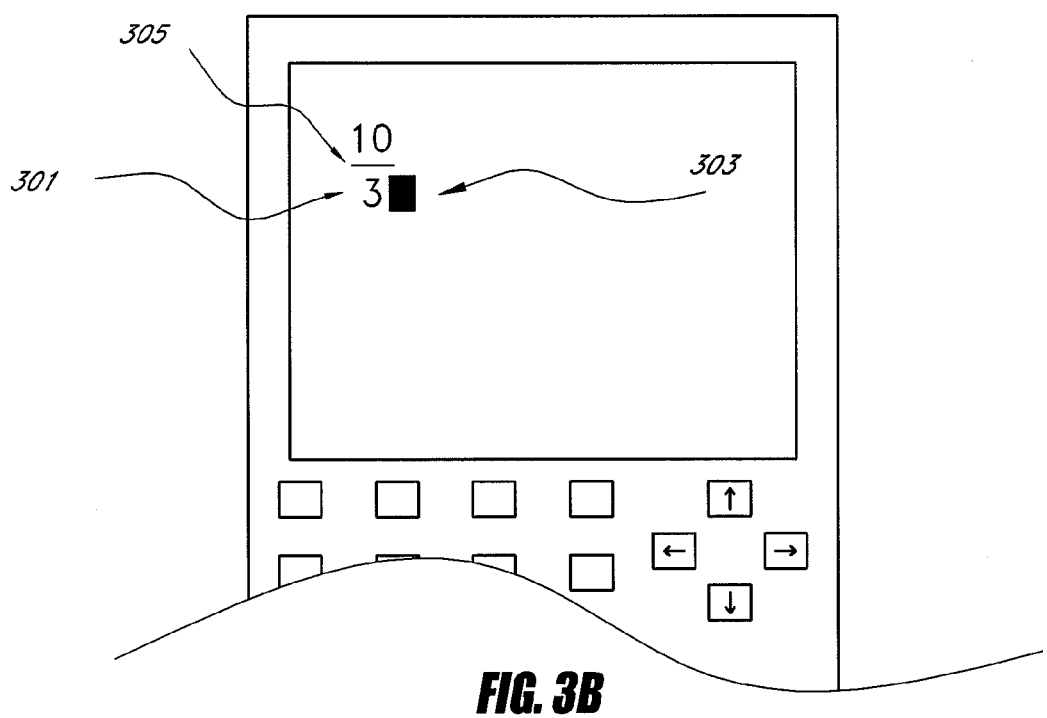
Figure 3C:
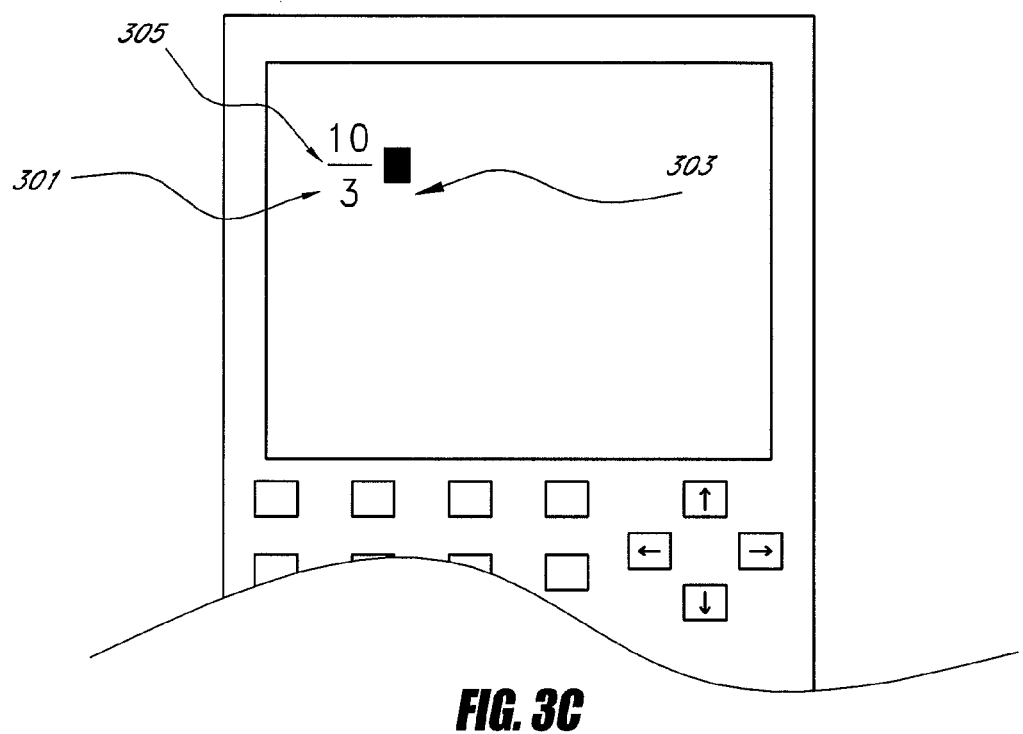

When the interface is in a bipositional entry mode, the multimode entry interface places the cursor in a special position to indicate that the next character the user enters can be inserted either inside or outside the denominator or radicand, as depicted in FIGS. 3A-3C and FIGS. 4A-4C. Referring to FIG. 3A, when the interface is in a bipositional entry mode and the cursor 303 is at the end of a denominator 301, the cursor 303 appears lower on the screen than the fraction bar 305, but slightly to the right of the fraction bar 305, not directly beneath the fraction bar 305. This indicates that the next character the user enters can be inserted either underneath the fraction bar 305 and inside the denominator 301 or to the right of the fraction bar 305 and outside the denominator 301. If the user presses the left arrow key, the cursor 303 moves underneath the fraction bar 305 and the interface reverts to the default mode as shown in FIG. 3B. If the user presses the right arrow key, the cursor moves up to the usual height of text outside the fraction and the interface reverts to the default mode as shown in FIG. 3C.

Figure 4A:
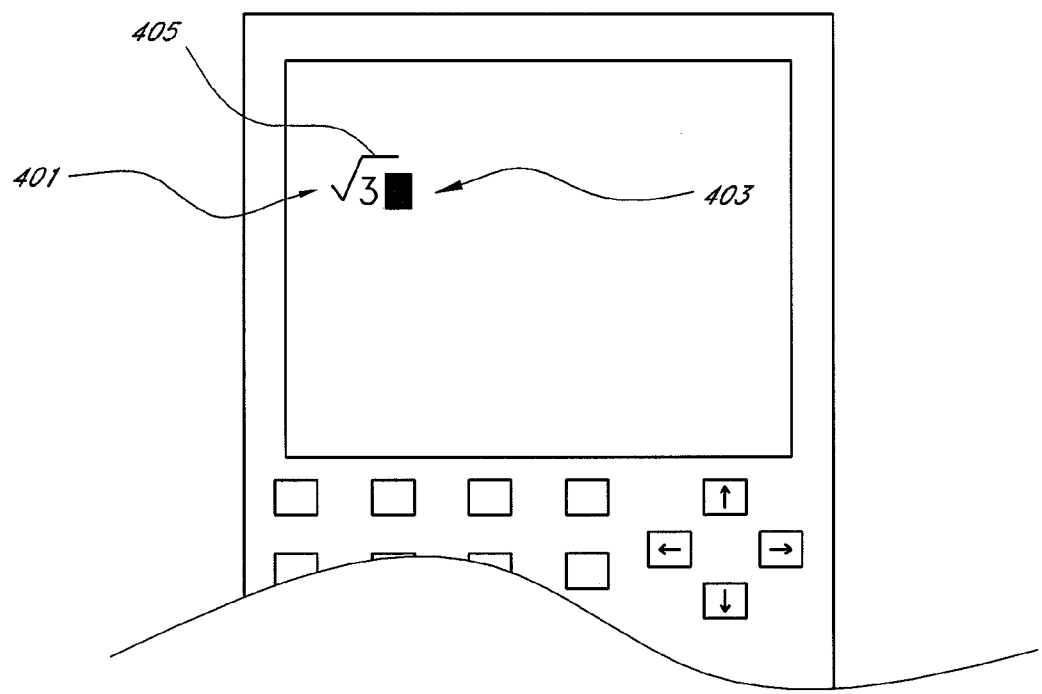
FIG. 4A-4C illustrates a screen shot of a bipositional entry mode of a radical.
Figure 4B:
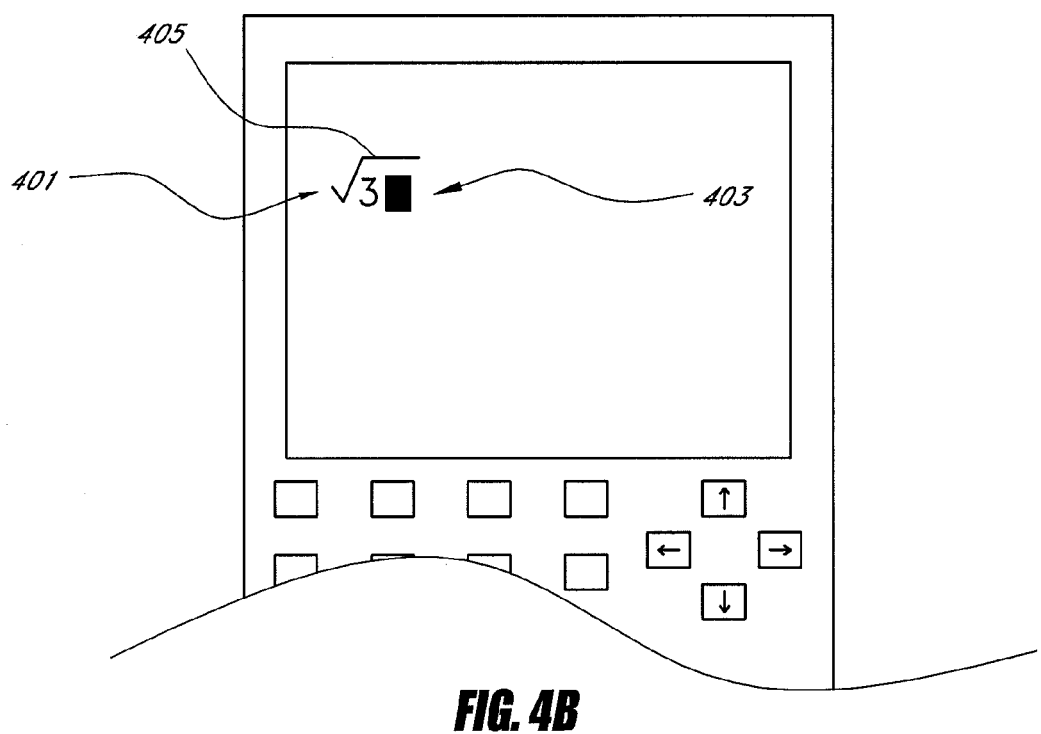
Figure 4C:
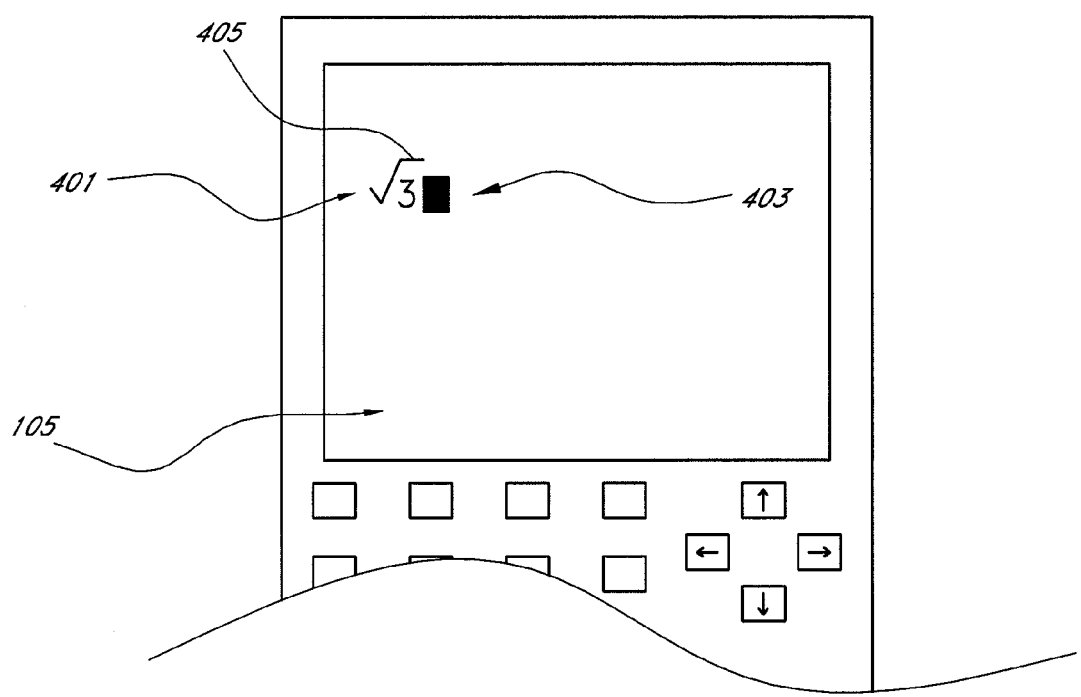

Similarly, referring to FIG. 4A, when the interface is in a bipositional entry mode and the cursor is at the end of a radical 401, the cursor 403 appears partially inside and partially outside the radical 401. To make the cursor appear to be partially inside the radical 401, the vinculum 405, or overhead bar of the radical symbol, extends about halfway across the cursor. This indicates that the next character the user enters may or may not be included within the radical 401 underneath the vinculum 405. If the user then presses the left arrow, the cursor moves back inside the radical 401, which means the vinculum 405 extends so it appears above the entire cursor 403 and the interface reverts to the default mode as depicted in FIG. 4B. If the user presses the right arrow, the cursor moves outside the radicand 401, which means the vinculum 405 withdraws so it no longer appears above any portion of the cursor, and the interface reverts to the default mode as depicted in FIG. 4C.

If the user presses any other arrow key that causes the cursor to move, the key will be handled normally and then the interface will revert to the default mode. It is sometimes the case that pressing an arrow key will have no effect. For example, pressing the down arrow key when the cursor is in a fraction's denominator will not usually move the cursor, and thus the interface will not revert to the default mode.

Again referring to FIG. 2, if the user presses the left parenthesis key while the multimode math entry interface is in the new structure entry mode 203, then the interface displays a "(" character as usual and then enters the parenthetical entry mode 209. While in the parenthetical entry mode 209, the interface generally remains in parenthetical entry mode until the user presses the corresponding right parenthesis. Specifically, if a right parenthesis is entered, the interface first enters the right parenthesis as directed by the user, and then the interface looks to see whether the corresponding left parenthesis is the first character of denominator or radical that the cursor is in. If the corresponding left parenthesis is not the first character of the denominator or radical the user is editing, then the interface takes no further action, and remains in parenthetical entry mode. If the corresponding left parenthesis is the first character of the denominator or radical, then both parentheses are deleted, the cursor is moved out of the denominator or radical, and the interface reverts to the default mode 201. Also, if the user presses any arrow key which causes the cursor to move, the interface reverts to default mode 201.

The multimode math entry interface enjoys unique advantages by emulating the behavior of both a linear math entry scheme and a structured math entry scheme. By intermingling these behaviors, the interface is able to interpret the user's keystrokes in exactly the way the user is most likely to expect.

For example, most users would intuitively expect the keystroke sequence 1/abc+2, to be interpreted as $$\frac{1}{abc} + 2.$$

In a linear scheme, this input would be interpreted to mean $$\frac{1}{a}bc + 2.$$

In a structured scheme, this input would be interpreted to mean $$\frac{1}{abc+2}.$$

By incorporating an alphanumeric bipositional entry mode 205, the multimode math entry interface is able to interpret the keystroke sequence 1/abc+2 as $$\frac{1}{abc} + 2,$$

exactly as a user would expect it to be interpreted.

In order to speed up entry of variables with fractional coefficients, the multimode math entry interface will not automatically include a letter in a fraction's denominator immediately following a number unless a fraction in the equation already contains a letter in its numerator or denominator. Thus, a user can rapidly enter the equation $$\frac{1}{2}x + \frac{2}{3}y = \frac{7}{6}$$

by typing ½x+⅔y=⅞, fulfilling the expectations of the average user. However, an expression which contains a fraction that has a variable in its numerator or denominator is unlikely to contain a variable with a fractional coefficient. For example, a textbook is not likely to contain the equation $$\frac{x}{2} = \frac{2}{3}y,$$

because the equivalent equation $$\frac{x}{2} = \frac{2y}{3}$$

is easier to read. Therefore, when any fraction already contains a letter in its numerator or denominator, numeric bipositional entry mode 207 is not used in a new fraction's denominator. For example, the keystroke sequence x/2+⅔y is interpreted as $$\frac{x}{2} + \frac{2}{3y},$$

and not as $$\frac{x}{2} + \frac{2}{3}y,$$

again fulfilling the expectations of the average user.

FIG. 2A illustrates the character entry flow in a multimode math entry interface. As shown in FIG. 2A, Entry Column 251 shows the character entries of the user. Mode Column 253 shows the mode that the multimode math entry interface is in after the corresponding character entry. Display Column 255 shows a representation of what is displayed. Entries 257, 259, 261, 263, 265, 267, 269, 271, 273, 275, 277, 279, 281 illustrate the step by step processing of the user's entries. As can be seen from the example of FIG. 2A, the multimode math entry interface changes entry modes based on the user's character entries.

In an embodiment, certain keys can affect the input mode. For example, pressing the square root key causes the interface to enter new structure input mode, regardless of the mode the interface was previously operating in. As another example, pressing the CLEAR key may be configured to erase the user's entire input and then cause the interface to revert to default entry mode, regardless of which mode the multimode math input interface was previously in.

In an embodiment, certain keys do not affect the input mode. For example, pressing the INSERT key may cause the interface to change from overstrike mode to insert mode, but otherwise will not affect the mode in which the multimode math entry interface operates.

Creating Fractions

Still referring to FIG. 2, in a linear math entry scheme, a user generally enters a fraction's numerator before pressing the fraction key. In a structured math entry scheme, a user generally enters the fraction key before typing a fraction's numerator. The multimode math entry interface uses this distinction to determine which style of math entry is desired for any given fraction. When the user presses the fraction key, the interface checks whether or not the user has already entered the fraction's numerator. If the user has not entered the fraction's numerator, then the interface continues to operate in default mode 201. If the user has entered the fraction's numerator, then the interface enters the new structure entry mode 203.

When a user presses the fraction key, the multimode entry interface first checks to see what the numerator and denominator of the new fraction would be if the entry were handled by a standard linear math entry scheme. For example, if a user enters "1" before pressing the fraction key, then the multimode math entry interface will interpret the "1" to be the numerator of a fraction, and will not find any denominator for the fraction. If the user enters "1+" before pressing the fraction key, then the multimode math entry interface will interpret the expression as 1 plus a fraction with an empty numerator and denominator. Where a user edits an expression and inserts a fraction, the multimode entry interface will look to the left and the right of the fraction to determine the numerator and denominator. For example, if the user enters "y+(x+1)−5", and then moves the cursor over the minus sign, and replaces the minus operator with a fraction operator, then the multimode math entry interface will interpret the resulting expression, "y+(x+1)/5", as y plus a fraction which has a numerator of (x+1) and a denominator of 5.

After identifying a numerator and denominator for the new fraction, the multimode math entry interface then creates a new fraction structure and moves the numerator (if any) and denominator (if any) into the fraction structure. If the numerator and/or denominator were enclosed in parentheses, the outermost pair of parentheses is removed. If the new fraction's numerator is empty, then the multimode math entry interface places the cursor in the new fraction's numerator. If the fraction's numerator is not empty and the fraction's denominator is not empty either, then the interface places the cursor at the beginning of the new fraction's denominator. If the fraction's numerator is not empty but the fraction's denominator is empty, then the interface places the input cursor in the new fraction's denominator and enters new structure entry mode 203. For example, if the user enters "1+(2+3)" and then presses the fraction key, the multimode math entry interface interprets everything in the parenthesis to be the numerator with an empty denominator. The interface creates a new fraction structure, moves the numerator (2+3) into the new fraction structure, and removes the parentheses around 2+3. The display looks like:

$$1 + \frac{2+3}{\phantom{.}}.$$

The interface then places the cursor in the new fraction's denominator. As discussed above, at this point, the interface moves to the new structure entry mode 203.

In an embodiment, if multiplication is explicitly indicated by means of a multiplication sign, then the interface will know not to include that multiplication sign or any previous factors in a new fraction's numerator, even if the standard rules of mathematical parser would indicate that the multiplication sign belongs in the fraction's numerator. For example, if the user types 5×2/, then the new fraction's numerator will be 2, not 5×2.

In an embodiment, the interface assumes that whenever multiplication is indicated by writing the factors next to one another, for example, as in the expression abc, if any factor is included in a new fraction's numerator or denominator, then the entire product will be included in the new fraction's numerator or denominator. This may conflict with the standard rules of mathematical parsing, but conforms to an average user's intuitive expectation. For example, if the user types 1+abc and then replaces the plus sign with a fraction bar, then the standard rules of mathematical parsing would require 1/abc to mean the same thing as $$\frac{1}{a}bc,$$

but the interface will instead interpret 1/abc to mean the same thing as $$\frac{1}{abc}.$$

Creating Radicals

Similarly, when a user presses the square root key, the multimode math entry interface creates a new radical symbol, puts the cursor inside the new radicand, and enters the new structure entry mode 203. If, however, a user wishes to edit a newly created radical as though the user were in a structured math interface, the user can press the right arrow to move the cursor out of the radical, then press the left arrow to move it back in. When the user uses the arrow keys to move the cursor, he automatically causes the entry interface to revert to its default mode 201, which operates like a structured math interface.

Creating Exponents

In an alternative embodiment, when a user presses the exponent key, the multimode math entry interface creates a new exponent and puts the cursor inside the new exponent. In an embodiment, the multimode user interface remains in the default mode 201, or reverts to default mode 201 if in another entry mode. In an embodiment, after creating the exponent and moving the cursor inside the exponent, the interface enters the new structure entry mode 203. In this embodiment, when the cursor is in bipositional entry mode at the end of an exponent, the cursor is displayed in a smaller size but at a lower height than would otherwise be displayed if the cursor were still in the exponent.

Editing Fractions

Figure 5:
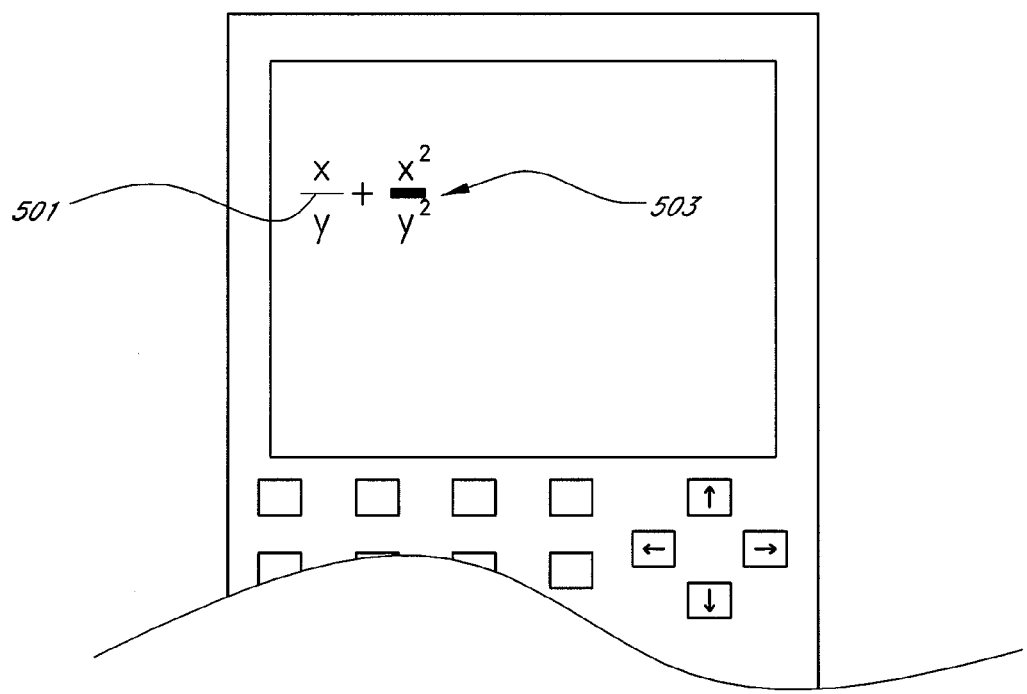
FIG. 5 illustrates a screen shot of a highlighted fraction bar.

In an embodiment, the multimode math entry interface also includes several additional features which pertain to fraction editing. In an embodiment, a user can move the cursor onto a fraction bar by pressing the up arrow key when the cursor is in the fraction's denominator. FIG. 5 illustrates the cursor positioned over the fraction bar 502. As illustrated, the fraction bar with cursor 503 is displayed differently then a fraction bar without the cursor 501. In an embodiment, a user can move the cursor onto a fraction bar by pressing the down arrow key when the cursor is in the fraction's numerator unless the fraction's denominator is empty. When the cursor is in the numerator of a fraction which has an empty denominator, pressing the down arrow will move the cursor directly into the fraction's empty denominator instead, as a user accustomed to a structured style of math entry might expect.

In an embodiment, when the cursor is on a fraction bar, the left arrow key moves the cursor to the left of the fraction, the right arrow key moves the cursor to the right of the fraction, the up arrow key moves the cursor to the fraction's numerator, and the down arrow key moves the cursor to the fraction's denominator.

In an embodiment, when the user presses the fraction key while the cursor is on a fraction bar, the interface replaces the entire fraction with a mathematically equivalent quotient which uses the division sign, "÷." Parentheses are inserted as necessary. For example, if the user highlights the fraction bar of $$\frac{1}{2}$$

and presses the fraction key, the expression becomes 1÷2. If the user highlights the fraction bar of $$\frac{x+1}{x+2}$$

and presses the fraction key, the expression becomes (x+1)÷(x+2). If the user highlights the fraction bar of $$\frac{1}{2}x$$

and presses the fraction key, the expression becomes (1÷2)x.

In an embodiment, when the user presses the delete key while the cursor is on a fraction bar, the interface acts as though the user had pressed the fraction key to convert the fraction bar to a division sign, and then immediately pressed the delete key to delete the new division sign. For example, if the user highlights the fraction bar of $$\frac{x+1}{x+2}$$

and presses the delete key, the expression becomes (x+1)(x+2). If the user highlights the fraction bar of $$\frac{1}{2}x$$

and presses the delete key, the expression becomes (12)x.

The ability to convert or delete a fraction bar is helpful to a user who made a mistake entering a fraction. For example, a user attempting to enter $$\frac{x+y+z+1}{5}$$

may mistakenly enter the keystroke sequence x+y+z+⅕. This will create the expression $$x+y+z+\frac{1}{5},$$

which is not what the user intended. If the user wishes to correct this mistake without retyping the whole expression, he can delete the fraction bar, then go back and insert parentheses around (x+y+z+1), then press the fraction key again to create a fraction. This time, the new fraction will have four terms in its numerator, as desired.

Creating Mixed Fractions

In an embodiment, the multimode math entry interface provides an easy to use entry system for mixed fractions. A mixed fraction consists of an integer followed by a proper fraction. For example, $$2\frac{1}{3}$$

is a mixed fraction. Mixed fraction entry is particularly difficult for many math entry interfaces, if it is provided for at all. In the multimode math entry interface, in order to enter the mixed fraction $$2\frac{1}{3},$$

a user enters the 2 key, then enters a space character, then enters the fraction ⅓. Or, if the cursor is at the end of the user's entry, the user can press the right arrow key to insert a space instead of typing a space character, as is advantageous on certain platforms.

Figure 6:
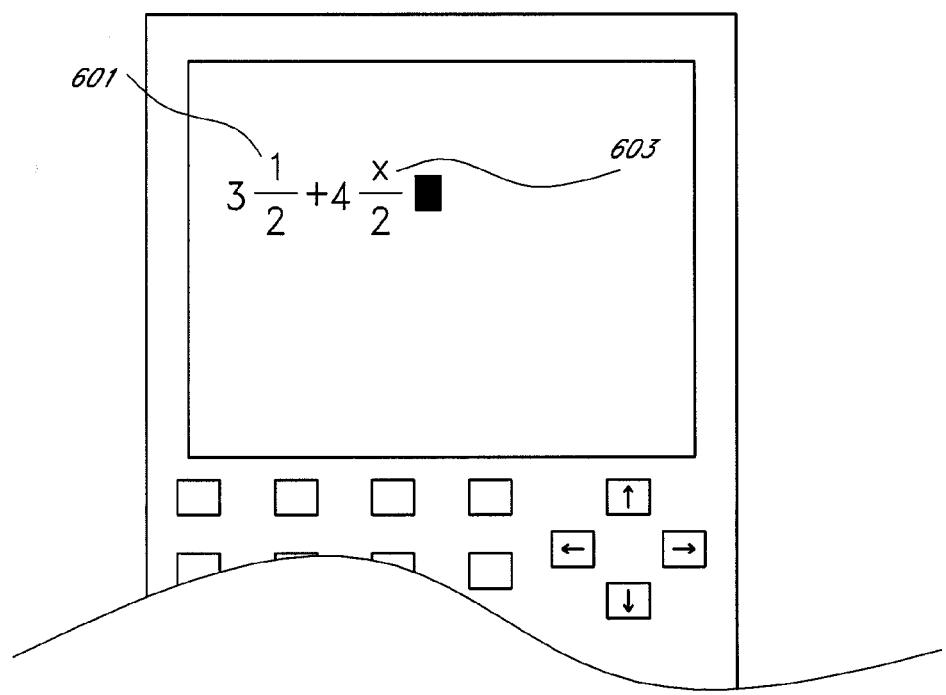
FIG. 6 illustrates a screen shot of a partial fraction.

In an embodiment, when the multimode math entry interface sees an integer followed by a fraction with only whole numbers in its numerator and denominator, the interface interprets this pattern as a mixed fraction, regardless of how it was created. For example, if a user enters $$2+\frac{1}{3}$$

and then deletes the + sign, the parser will interpret the expression as a mixed fraction, even though it was not created the usual way mixed fractions are created. Also, in order to avoid confusion, the multimode math entry interface displays the fractional portion of the mixed fraction in a smaller font to help the users recognize that it will be treated as a mixed fraction. FIG. 6 illustrates an example of a partial fraction 601 displayed in a smaller font than a normal fraction display 603. As shown in FIG. 6, in the mixed fraction $$401\ 3\frac{1}{2},$$

the fraction $$\frac{1}{2}$$

appears in a smaller font than a normal non-mixed fraction 603. If the 1 in the mixed fraction 601 is replaced with an x, the fraction $$\frac{x}{2}$$

will immediately revert to the normal-sized font, because $$3\frac{x}{2}$$

is not interpreted as a mixed fraction in this embodiment. In an alternative embodiment, any fraction immediately following a numeral will be interpreted as the fraction portion of a mixed fraction, regardless of whether or not its numerator and denominator are whole numbers. In this embodiment, $$2\frac{x}{3}$$

is interpreted as a mixed fraction.

Automatic Expulsion of Relational Operators

In an embodiment, additional rules are applied to relational operators. Relational operators generally include the equal operator "=," the less than operator, "<," the less than or equal to operator, "≤," the greater than operator, ">," and the greater or equal to operator, "≥." Mathematical expressions generally do not contain relational operators within fractions, exponents, or radicals. If the user presses a relational operator key when the cursor is at the end of a denominator, exponent, or radical, the interface will automatically move the cursor out of the fraction, exponent, or radical. It will then check whether the cursor is at the end of another denominator, exponent, or radical. If it is, the interface will move the cursor out of the fraction, exponent, or radical as well. The interface will repeat this procedure until the cursor is not at the end of any denominator, exponent, or radical, and will then insert the appropriate relational operator.

For example, after a user enters 1/x^y, the cursor is at the end of an exponent within a fraction's denominator. If the user then presses the = key, the interface will move the cursor out of the exponent and out of the fraction before inserting an equals sign in the output. The resulting expression will be $$\frac{1}{x^y} =.$$

Automatic Expulsion of Unmatched Right Parentheses

In an embodiment, if the user presses a right parenthesis key when the cursor is at the end of a denominator, exponent, or radical, the interface will check whether that denominator, exponent, or radical contains a matching left parenthesis. If it does not, then the interface will automatically move the cursor out of that denominator, exponent, or radical. It will then check whether the cursor is now at the end of another denominator, exponent, or radical which contains a corresponding left parenthesis. If there is still no corresponding left parenthesis, the entry interface will move the cursor out of this fraction, exponent, or radical also. It will repeat this procedure until the cursor is not at the end of any denominator, exponent, or radical, or until a corresponding left parenthesis is found. It will then insert the ")" character.

For example, after a user enters 1/(x^y, the cursor is at the end of an exponent within a fraction's denominator. If the user then presses the right parenthesis key, the interface will move the cursor out of the exponent, but it will not move the cursor out of the fraction's denominator, because the fraction's denominator contains the matching left parenthesis. The resulting expression will be $$\frac{1}{(x^y)}.$$

However, if a user enters 1/x^y, and then presses the right parenthesis key, then the interface will move the cursor out of the exponent and out the fraction's denominator before printing a right parenthesis. The resulting expression will be $$\frac{1}{x^y} \Big).$$

Cursor Movement

In an embodiment, moving the cursor when in a mode other then the default mode will always return the interface to the default mode. For example, a user may wish to enter $$\frac{x+1}{3x+3}$$

via the keystroke sequence (x+1)/(3x+3). If the user makes a mistake while typing the denominator of this expression, and uses the left arrow key to go back and correct this mistake, then pressing the left arrow key will cause the interface to revert to exit parenthetical entry mode which will prevent the left parenthesis in the denominator from being automatically removed. For example, the keystroke sequence (x+1)/(2←-3x+3) will create the fraction $$\frac{x+1}{(3x+3)}, \text{ not } \frac{x+1}{3x+3}.$$

In an alternative embodiment, moving the cursor when in a mode other then the default mode will not cause the return the interface to the default mode unless the cursor is moved out of the denominator or radical currently being edited.

Nested Operators

In an embodiment, the multimode math entry interface will not naturally allow entry of nested fractions, radicals, and exponents in the style of a linear math input interface. For example, when a user types the keystroke sequence 1/(½), the interface does not automatically remove the parentheses around the fraction's denominator, for several reasons. First, pressing the left parenthesis key does cause the interface to enter parenthetical input mode. Next, pressing the fraction key the second time causes the interface to enter new structure input mode. Next, pressing 2 causes the interface to enter a bipositional input mode. Finally, pressing a right parenthesis when in a bipositional input mode causes the interface to revert to default mode, without ever removing the paired parentheses.

In an alternative embodiment, the multimode math entry interface allows entry of nested fractions, radicals, and exponents in the style of a linear math input interface. In this embodiment, the interface retains in memory a stack of relevant special input modes which are currently inactive. When the user finishes creating a new fraction, radical, or exponent, the interface pops the most recent relevant special input mode off the stack, if any, instead of always reverting to default mode. For example, when a user types the second fraction key of the keystroke sequence 1/(½), the interface will push its current parenthetical input mode setting onto the stack before entering the new structure input mode. Subsequently, typing 2 followed by a right parenthesis will cause the interface to exit a bipositional input mode, but the interface will not then merely revert to default mode. Instead, it will pop parenthetical input mode off the input mode stack. The right parenthesis will require special handling due to the reactivation of parenthetical input mode, so the paired parentheses will be removed. The interface will then exit parenthetical input mode. Upon exiting parenthetical input mode, the interface will revert to default mode, unless another special input mode remains on the input mode stack, in which case the interface will reactivate that special input mode.

Undo Functionality

In an embodiment, the multimode math entry interface is further enhanced by adding an Undo feature. In an embodiment, pressing the Undo key repeatedly reverses the effects of the keystrokes the user just entered, one at a time. In an embodiment, the Undo feature is further enhanced by treating automatic additional changes as independent actions so that the automatic changes can be undone one by one if not desired. For example, when the user presses the last key in the keystroke sequence 1/(xy), the multimode math entry interface inserts a right parenthesis in the new fraction's denominator as expected, and then automatically removes both parentheses from the new fraction's denominator. If the user then presses Undo once more, the interface will undo the automatic action, restoring both parentheses. The interface generally will not also remove the right parenthesis unless the user presses Undo a second time, even though both changes were triggered by a single keystroke.

Exponent Entry Shortcuts

In an embodiment, when a user creates a new exponent or radical, the interface automatically determines the base of the exponent. If the exponent's base is a fraction which is not enclosed in parentheses, or a radical which is not enclosed in parentheses, or an exponential expression which is not enclosed in parentheses, the interface automatically inserts enclosing parentheses around that fraction, radical, or exponential expression. This prevents confusion. For example, if the user enters $y^3$ and then presses the $x^2$ key, the base of the new 2 exponent will be $y^3$. The multimode entry interface will insert $y^3$ in parentheses, so the resulting expression will be $(y^3)^2$, not $y^{3^2}$.

In an embodiment, when a user presses a digit key, the interface checks the character immediately to the left of the cursor and if that character is a letter, then the interface automatically causes the new digit character to become an exponent. If that character is a digit which is at the end of an exponent, then the interface inserts the new digit character in that exponent. In either case, the cursor itself does not move into the exponent. This enables users to enter most powers of variables quickly without using any special keys. For example, a user can quickly enter the expression $4x^{22}y^3$ by simply typing "4x22y3".

Cycling Keys

In an embodiment, one or more keys have special effects when pressed rapidly two or more times. These keys are referred to herein as "cycling keys." The first time a user presses a cycling key, the interface displays a certain character or character combination on the screen. Each subsequent time the user rapidly presses the same key, the interface replaces that character with a different character. This rapid pressing of the same key to cause a different character to be displayed is referred to herein as "cycling."

Although cycling keys are common for some enters of electronic devices, such as cell phones, cycling keys are not commonly used in connection with a math function entry program, such as, for example, on a graphing calculator. This is generally the result of the fact that graphing calculators have a larger number of buttons then a typical cell phone, and therefore cycling keys are not critical. However, a typical graphing calculator has fewer keys than a personal computer keyboard has, and generally speaking, a graphing calculator user enters characters using a single finger rather than multiple fingers as is generally used on a personal computer keyboard. A typical handheld calculator user can find a single key and press that key twice more quickly than he can find and press two different keys. In fact, a user may be able to press a single key three or four times more quickly than he can find and press two different keys. A keystroke combination which requires a user to "double-click" or even "triple-click" a single key can be entered more rapidly than a keystroke combination which requires a user to press two different keys on a graphing calculator.

In addition, the cycling keys of a math function entry program have advantages over the cycling keys of a cell phone. A cell phone user who wishes to enter "tt" must press the 8 key twice, but the user must deliberately wait between consecutive key presses or be forced to press a third intermediate button. Otherwise, the cell phone's cycling functionality will cause "u" to appear instead of "tt." By contrast, in the multimode math entry interface, every cycling key is a key that a user would seldom want to press consecutively without invoking the cycling feature. For example, in an embodiment where an $x^2$ key is a cycling key, a user will seldom want to enter two consecutive exponents of 2.

In an embodiment, the multimode math entry interface can switch between display styles quickly by cycling certain keys. For example, when the fraction key is pressed once, a fraction bar as described above will appear. If the fraction key is cycled, then a division sign "÷" will replace the fraction bar.

In an embodiment, a specialized exponent key, such as the $x^2$ key, is configured to be cycled to create exponents of 3 or higher. For example, pressing the $x^2$ key once creates an exponent of 2. The second time the user rapidly presses the $x^2$ key, the interface increases the previously created exponent to 3, and so on. Each time the user rapidly presses the $x^2$ key, the interface increases the previously created exponent by 1. Similarly, in an embodiment, a user can create negative exponents by cycling the $x^{-1}$ key. The first time the user presses the $x^{-1}$ key, the interface creates an exponent of −1. The second time the user rapidly presses the $x^{-1}$ key, the interface decreases the previously created exponent to −2, and so on. Each time the user rapidly presses the $x^{-1}$ key again, the interface decreases the previously created exponent by 1. These exponent cycling keys enable users to rapidly enter small exponents such as $x^3$ and $x^4$ without having to find and press two distinct keys. For example, a user can quickly enter $4^3$ by pressing 4 and then double-clicking the $x^2$ key.

In an embodiment, a predetermined key, such as the √ key, can be cycled in order to change the index of the root function. For example, the first time the user presses the √ key, the interface creates a square root. The second time the user rapidly presses the √ key, the interface adds a small 3 index at the front of the √ symbol, thus converting the square root to a cube root. Each time the user rapidly presses the √ key again, the interface increases the previously created index by 1.

In an embodiment, in order to cycle a secondary function key, a user only needs to press the combinational sequence once and then cycle only the secondary function key. For example, on some calculators, the √ key is a secondary function of the $x^2$ key. To enter a square root, a user must press the two-key combination 2ND then $x^2$. Any subsequent rapid key presses of the √ key will invoke the cycling feature as described above, with no need to press 2ND or SHIFT again. However, if a user is likely to use such a key's primary function immediately after using that key's secondary function, then cycling in some embodiments is not provided for that key.

The Repeated Variable Shortcut Key

On a standard computer keyboard, a user can enter any letter with a single keystroke, and many people who use computers are very familiar with the arrangement of letters on the standard keyboard, so they can find letters quickly. However, on a typical graphing calculator, a user who wishes to enter a letter must first press the ALPHA key and then press some other key. Furthermore, many people who use graphing calculators are not very familiar with the arrangement of letters on the graphing calculator keyboard. Finding the correct letter key will usually take a fraction of a second longer than finding, say, the ALPHA key. This extra delay is inconvenient.

Graphing calculator keyboards are used primarily to enter mathematical expressions. With this in mind, useful shortcut keys can be created. For example, the letters which seems to appear most frequently in mathematical expressions is x, so many graphing calculators have a shortcut key for x specifically, so that a user does not need to press a two-keystroke combination to enter x.

In one embodiment of the multimode entry interface, other shortcuts for typing letters are provided. These shortcuts are based on the assumption that many mathematical expressions contain the same letter or letters repeated several times. A predetermined key is chosen to be used as the shortcut key for entering previously entered variables. Whenever the user presses the predetermined key, the interface creates a list of the variables which the user had previously entered in the order that the user entered them. In an embodiment, the variable list is created and stored independent of whether the variables were used in the current expression or in a previous expression. In an embodiment, only the variables currently used in the expression are stored and displayed. In an embodiment, the variable list from the previous list is kept until replaced by the variable list of the current expression on an entry by entry basis.

In an embodiment, after creating the variable list of the letters which the user has previously entered, the interface appends to the variable list to all other lowercase letters and all other uppercase letters, so that the list contains a total of 52 letters, 26 lowercase and 26 uppercase letters. In an embodiment, lowercase letters are appended in alphabetical order first, and then uppercase letters are appended in alphabetical order.

In an embodiment, the predetermined variable list key is a cycling key, as described above. The first time the user presses the predetermined variable list key, the interface prints the first letter from the variable list, as though the user had entered that letter. If the user then rapidly presses the predetermined variable key a second time, the interface replaces the letter it just printed with the second letter from the variable list, and so on. If the user rapidly presses the predetermined variable key a fifty-third consecutive time, the interface will go back to the start of the variable list and substitute the first letter again.

Without the predetermined variable shortcut key, a typical graphing calculator user who wishes to enter the expression $16rq^3-8rq^2-15rq$ will have to locate the correct key to press 22 times. Use of the predetermined variable key will reduce this effort considerably. The first time the user enters the letters r and q, the user will likely need to find the keys ALPHA R and ALPHA Q as usual. But every subsequent time the inventor wishes to enter the letters r and q, he will only need to find the predetermined variable shortcut key.

Special Display Features

In arithmetic, the cross symbol x is frequently used for multiplication. Many students do not know that there is any other way to indicate multiplication until they begin to learn algebra. The cross symbol is rarely used in algebra, for fear that it will be confused with the letter x. In algebra, multiplication is usually indicated by simply writing factors next to one another. For example, x times y is written as xy. Occasionally the dot symbol, "·", is used in algebra to indicate multiplication. To reflect such usage, in an embodiment, the multimode math entry interface reserves a bit flag to indicate whether the user has entered any variables. Upon entering the program, this flag is initially cleared. If a user presses the multiplication key × when this flag is cleared, a cross symbol appears. Whenever the user enters a letter, this flag is set, and any cross symbols which appear in the current expression are replaced with dot symbols. Subsequently, any time the user presses the multiplication key, a dot symbol appears.

Figure 7:
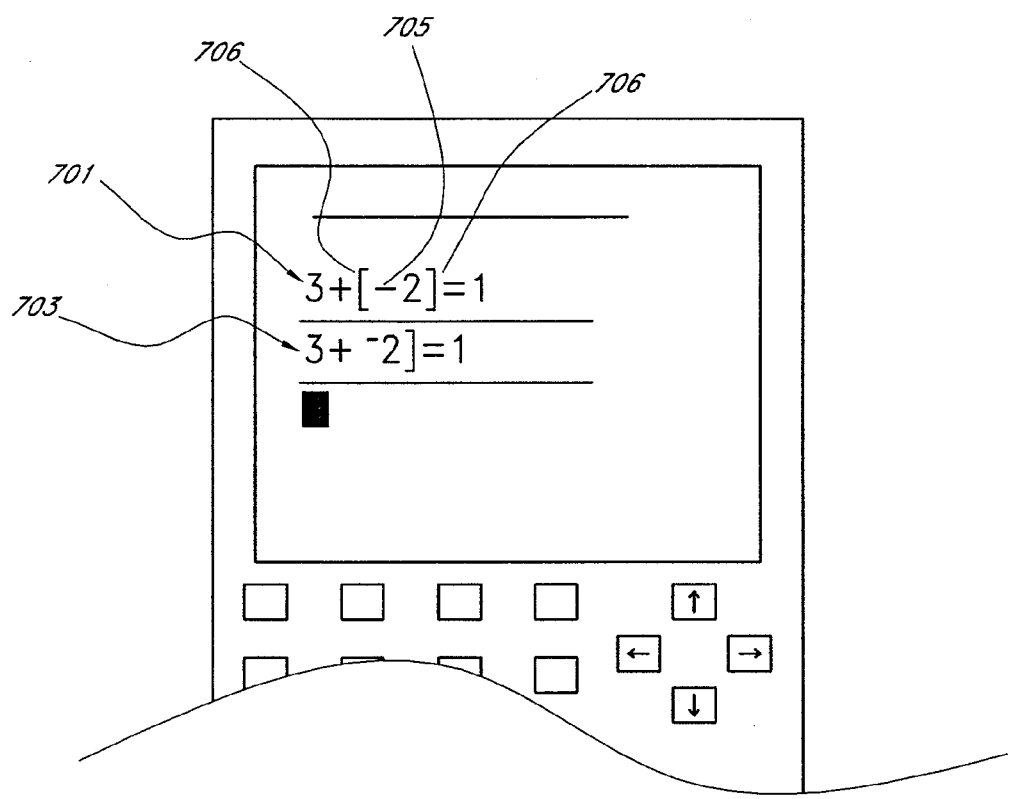
FIG. 7 illustrates a screen shot of two separate formats for displaying a negative sign.

Many publishers print positive signs the same way they print plus signs, and negative signs the same way they print minus signs. Such publishers generally do not print a signed number immediately after a mathematical operator without enclosing the signed number in parentheses. For example, such publishers generally will not print "3÷−2", but will instead print "3÷(−2)". However, some publishers print positive and negative signs in a smaller, elevated font. Such publishers will sometimes print a signed number immediately after a mathematical operator, and not enclose the signed number in parentheses. For example, such a publisher might print "3÷⁻2". To reflect such usage, in an embodiment, the multimode math interface will automatically print a plus or minus sign in a smaller, elevated font when that plus or minus sign immediately follows another mathematical operator. FIG. 7 illustrates an embodiment 701 in which the minus sign 705 is included within parentheses 706 and an embodiment 703 in which the minus sign 707 is shown in an elevated font.

Figure 8:
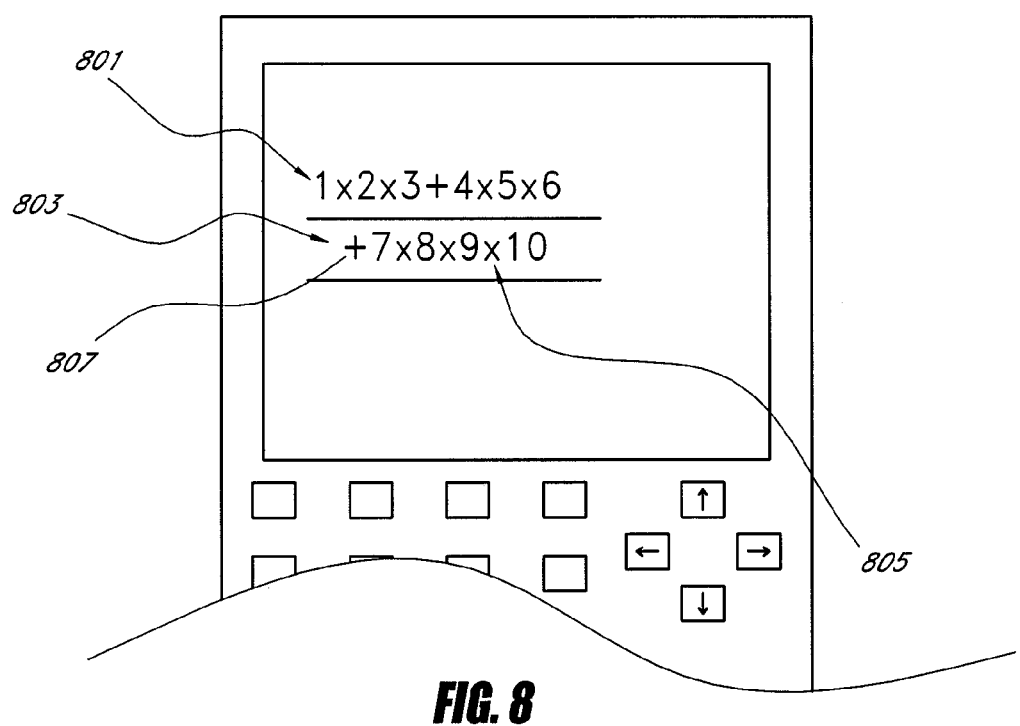
FIG. 8 illustrates a screen shot of an expression entry split between two display lines.

Many graphing calculators have a screen too narrow to contain a very long expression on a single line. When an expression becomes too long to fit on a single line, graphing calculators will generally wrap the excess characters onto subsequent lines, without regard to where in the entry the line break occurs. A line break may even occur between digits of a multi-digit numeral. When an expression becomes too long to fit on a single line, in an embodiment, the multimode math entry interface submits the expression to an associated parser, which determines the mathematical structure of the expression. The interface then attempts to break the line after the operator which has the lowest precedence. For example, if a screen is wide enough to fit the expression "1×2×3+4×5×6+7×8×9" but not wide enough to fit the expression "1×2×3+4×5×6+7×8×9×10", and the user enters the latter expression, then the multimode math entry interface will break this line after the last plus sign, not after the last multiplication sign. FIG. 8 illustrates a page break of the above example where the expression is divided between two lines 801, 803, but the page break is placed at the plus operator 807 rather than the last operator 805.

Step by Step Equation Solver

In an embodiment, the multimode math entry interface operates in conjunction with a computer math solving system that is able to simplify mathematical expressions and solve mathematical equations and systems of equations. In an embodiment, pressing a specific button (such as ENTER) causes the interface to submit an expression to the computer math solving system for solution, and then to display the resulting simplified or solved expression. In an embodiment, pressing a specific button causes the interface, operating in conjunction with a computer math solving system, to show every step of the procedure for simplifying a mathematical expression or solving a mathematical equation or system of equations.

In an embodiment, a special mode, referred to herein as "showing steps mode," can be selected which displays step by step solutions to equations. In an embodiment, pressing the left arrow key causes the interface to erase the previously displayed step, and then to exit the showing steps mode if no steps are currently being displayed. Pressing the right arrow key causes the interface to show the next step of the solution procedure, or to exit showing steps mode if no steps remain. In an embodiment, selecting the key which caused the interface to enter showing steps mode also causes the interface to show the next step of the solution procedure, or to exit showing steps mode if no steps remain. In an embodiment, the final step of a solution procedure is displayed in a distinctive way, such as in a boldface font, underlined, in a different color, flashing, or in a different size font. In an embodiment, pressing a specific key, such as, for example, the up arrow key, when one or more solution steps are showing causes the interface to replace the last visible solution step with a smaller step if available. In an embodiment, pressing a specific key, such as, for example, the down arrow key, when one or more solution steps are showing causes the interface to replace the last visible solution step with a larger step if available.

As referred to in the preceding paragraph, a "smaller step" is a mathematical step which requires less mathematical manipulation, and a "larger step" is a mathematical step which requires more mathematical manipulation. For example, in the equation 5x+2=2x+5, when a computer math solving system does only one step in solving that equation, the equation which results from doing one step could be 5x+2-2x-2=2x-5-2x-2, or the equation which results from doing one step could be 3x=3. The latter would be described as a "larger step" because more mathematical manipulation is required to transform the original equation 5x+2=2x+5 to the latter equation than to the former equation. In an embodiment, the showing step mode automatically walks a user through the steps required to solve an equation without the user having to press a key between steps. For example, when solving an equation, the display shows the next step, waits a predetermined period of time, and then displays the following step. When the equation is solved, no more steps are performed, and the resulting answer is displayed.

Although the foregoing invention has been described in terms of certain preferred embodiments, other embodiments will be apparent to those of ordinary skill in the art from the disclosure herein. For example, the process of changing between various entry modes, which was described herein with respect to entry of fractions, radicals, and exponents, could also be applied to the entry of other mathematical expressions which are customarily displayed with special formatting, such as summations, limits, and definite integrals. Additionally, other combinations, omissions, substitutions and modifications will be apparent to the skilled artisan in view of the disclosure herein. It is contemplated that various aspects and features of the invention described can be practiced separately, combined together, or substituted for one another, and that a variety of combination and subcombinations of the features and aspects can be made and still fall within the scope of the invention. Furthermore, the systems described above need not include all of the modules and functions described in the preferred embodiments. Accordingly, the present invention is not intended to be limited by the recitation of the preferred embodiments, but is to be defined by reference to the appended claims.

I claim:

1. A calculation device comprising:
   entry keys configured to allow a user to enter various mathematical expressions;
   a display configured to display mathematical expressions; and
   a processor configured to:
      receive a plurality of math expression entries from the user;
      predict, based at least in part on at least one past math expression entry, an entry mode preference of the user, wherein the entry mode preference corresponds to one of a linear math expression entry scheme or a structured math expression entry scheme; and
      configure the display to output a current math expression entry in the entry mode preference.

2. The calculation device of claim 1, wherein the processor, the entry keys and the display are comprised within a calculator.

3. The system of claim 2, wherein the calculator is a graphing calculator.

4. The system of claim 2, wherein the calculator is part of a computer.

5. The system of claim 1, wherein the processor is part of a network.

6. The system of claim 1, wherein the processor is comprised within a portable electronic device.

7. The calculation device of claim 1, wherein the processor is further configured to place a cursor in a bipositional entry mode position to indicate that the next math expression entry may be displayed in either the linear math expression entry scheme or the structured math expression entry scheme.

8. A method of interpreting and displaying a series of character entries in a mathematical expression on a calculation device, the method comprising:
   receiving user inputs representative of characters in a mathematical expression;
   predicting, based at least in part on at least one past user input entry, an entry mode preference of the user, wherein the entry mode preference corresponds to one of a linear math entry mode or a structured math entry mode; and
   displaying a current input entry in the user's entry mode preference.

9. A calculation system for entering a mathematical expression in a calculation device which provides an intuitive and easy to use entry system, the calculation system comprising:
   entry keys configured to allow a user to enter various mathematical expressions including both letters and numbers;
   a display configured to display mathematical expressions; and
   a processor configured to:
      receive entry key inputs entered by a user;
      display a mathematical expression representing the entry key inputs on the display; and
      store entered variables in a cycle key buffer in the order that the variables were entered; and
   a cycle key, wherein when the cycle key is pressed, the processor retrieves one of the variables stored in the cycle key buffer, the retrieved variable corresponding to a number of times the cycle key is pressed, wherein the retrieved variable is output to the display.

10. A method of keying in an exponent in a mathematical expression using a processor based system, the method comprising:
    receiving user inputs representative of alphanumeric characters and mathematical operators comprised within a mathematical expression;
    automatically adjusting a number entry to be an exponent value when said numeric entry immediately follows a variable entry without requiring the user to push a separate exponent modifier;
    displaying said mathematical expression.

11. The calculation device of claim 7, wherein an entered math expression comprises an exponential expression.

12. The calculation device of claim 11, wherein the cursor in bipositional entry mode appears at the end of an exponent in the exponential expression and is displayed at a lower height than the cursor when it is displayed in the exponent.

13. The calculation device of claim 11, wherein the current math expression entry is entered outside the exponent if the preference of the user is determined to be the linear math expression entry scheme and is entered inside the exponent if the preference of the user is determined to be the structured math expression entry scheme.

14. The calculation device of claim 7, wherein an entered math expression comprises a radical expression.

15. The calculation device of claim 14, wherein the cursor in bipositional entry mode appears at least partly inside the radical and at least partly outside the radical.

16. The calculation device of claim 14, wherein the current math expression entry is entered outside the radicand if the preference of the user is determined to be the linear math expression entry scheme and is entered inside the radicand if the preference of the user is determined to be the structured math expression entry scheme.

17. The calculation device of claim 7, wherein an entered math expression comprises a fractional expression, the fractional expression comprising a numerator, a denominator, and a fraction bar between the numerator and denominator.

18. The calculation device of claim 17, wherein the cursor in bipositional entry mode appears lower on the display than the fraction bar and slightly to the right of the fraction bar.

* * * * *